W. E. WILLIAMS.
MACHINE FOR MAKING SHREDDED WHEAT BISCUITS.
APPLICATION FILED JUNE 30, 1905. RENEWED MAR. 18, 1909.
931,243.
Patented Aug. 17, 1909.
3 SHEETS—SHEET 1.
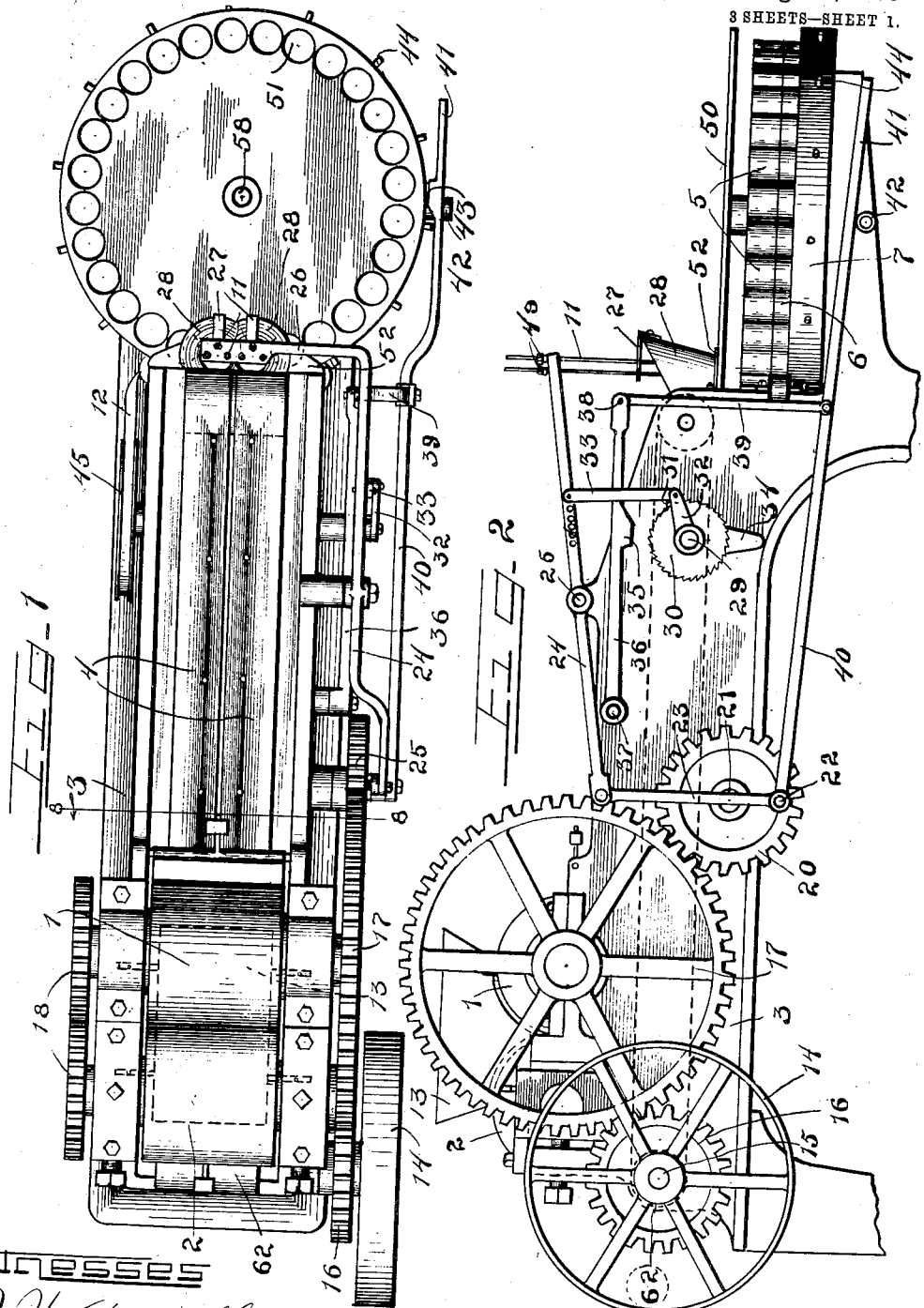

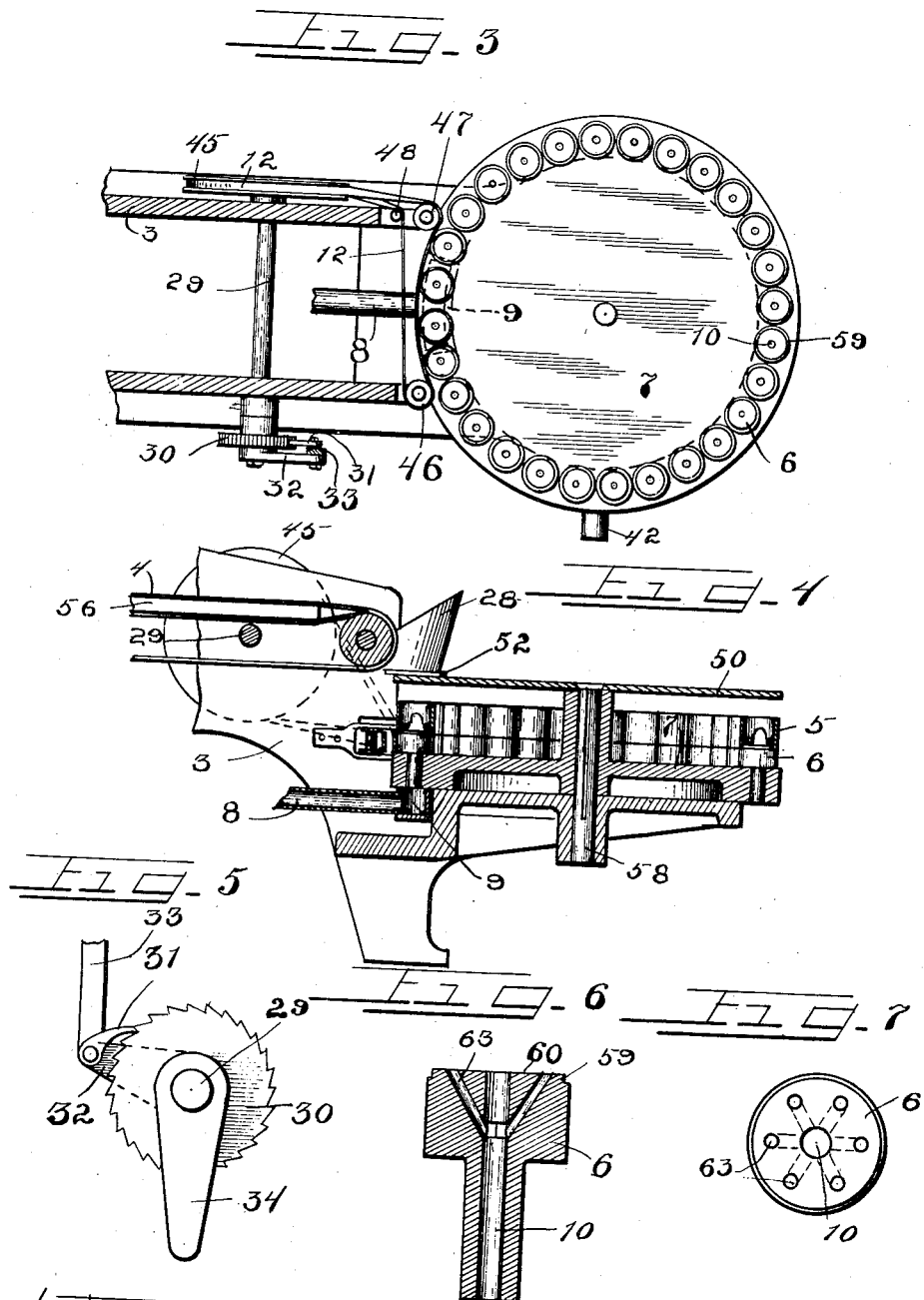

W. E. WILLIAMS.
MACHINE FOR MAKING SHREDDED WHEAT BISCUITS.
APPLICATION FILED JUNE 30, 1905. RENEWED MAR. 18, 1909.
931,243.
Patented Aug. 17, 1909.
3 SHEETS—SHEET 3.
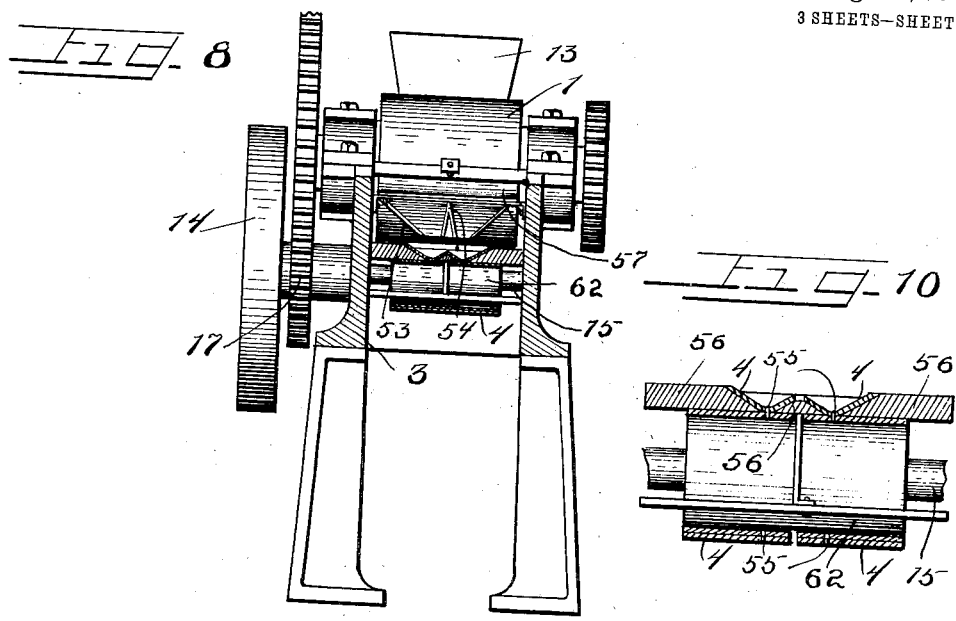
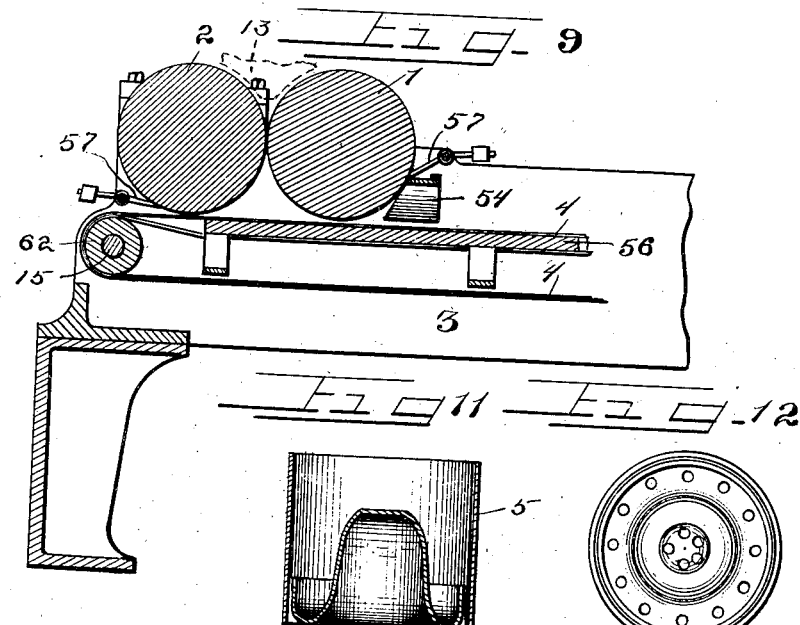

UNITED STATES PATENT OFFICE.

WILLIAM ERASTUS WILLIAMS, OF CHICAGO, ILLINOIS.

MACHINE FOR MAKING SHREDDED-WHEAT BISCUITS.

No. 931,243.  Specification of Letters Patent.  Patented Aug. 17, 1909.

Application filed June 30, 1905, Serial No. 267,787. Renewed March 18, 1909. Serial No. 484,276.

*To all whom it may concern:*

Be it known that I, WILLIAM ERASTUS WILLIAMS, a citizen of the United States, residing at Chicago, in the county of Cook and State of Illinois, have invented a new and useful Improvement in Machines for Making Shredded-Wheat Biscuits, of which the following is a specification.

The object of my invention is to provide a desirable machine for making shredded wheat or other biscuits, and the invention consists in the devices set forth in the claims.

Reference will be had to the accompanying drawing in which—

Figure 1 is a plan view of the machine. Fig. 2 is a side elevation of the machine. Fig. 3 is a plan detail of the delivery end of the machine. Fig. 4 is a side sectional detail of the front end of the machine. Fig. 5 is a detail of parts of the timing device. Figs. 6 and 7 are details of the cup spindles. Fig. 8 is a sectional elevation on line 8—8 of Fig. 1. Fig. 9 is a vertical sectional detail through the shredding rolls. Fig. 10 is a transverse sectional detail showing the guides for the carrier belts. Figs. 11 and 12 are views of the baking cups.

I provide a shredding device of any suitable construction which I show in the drawing as made of rolls 1 and 2 mounted upon any suitable frame 3. The shreds are delivered upon shred carriers of any suitable construction, but I prefer to use the belts 4 which deliver the shreds into baking cups or forms 5 which are carried upon spindles 6 mounted to revolve in a carrier wheel 7 having a vertical axis 58 in the frame. An air suction is produced by any suitable means of exhaust (not shown) and is connected by a pipe 8 to a chamber 9 which is connected by cavities 10 and 63 through the spindles 6 to the inside of cups 5 to suck the shreds down into the cups when the cups are in position to be filled. The chamber 9 extends only under the cups that are being filled and the lower side of the wheel 7 fits as a cover over the top of chamber 9. In addition to the suction to place the shreds into the cups, I provide sets of tampers or packers 11 which reciprocate vertically, pushing the shreds into place in the cups as the shreds are delivered by the belts 4. The spindles 6 are made to revolve intermittently by a belt 12 while they are being filled. The carrier wheel 7 is made to move intermittently allowing a period of rest sufficient to fill the cups. Thus the wheat or the suitable prepared stock from which the shreds are to be made is placed in the hopper 13 and the rolls convert it into shreds which are formed into shape in the cups 5 which are removed by hand, or other suitable means and fresh cups supplied in a similar manner.

The machine is driven by a belt wheel 14 driving a shaft 15 carrying a pinion 16 which drives a span gear 17 on the shaft of one of the rolls and the rolls are geared together by gears 18. The pulleys 62 on shaft 15 drive the belts 4 much faster than the lineal rate of delivery of the shreds whereby the shreds assume a straighter position on the belts and are discharged with impact into the forms.

The mechanism for moving the carrier wheel 7 the packers and the cup spindles 6 is driven by the gear 20 on shaft 21 on which there is a crank 22 which is connected by a link 23 to a walking beam 24, having an axis 25 on the frame of the machine. Walking beam 24 is provided with an arm 26 having apertures which carry the packers, the lower ends of which are guided by perforated blocks 27, which are supported by the curved hoppers or guide way 28, which directs the shreds into the cups as the shreds are delivered by belts 4. A shaft 29 and the fixtures thereon act as a timing device and it extends across the machine and is driven intermittently by ratchet 30 and pawl 31 carried by an arm 32 moved by a link 33 connected to walking beam 24. The shaft 29 carries a block 34 which when in an upward position engages a block 35 on an arm 36 pivoted at one end 37 to the frame of the machine and at the other end 38 connected to a link 39 connected to a bar 40 which is connected to crank 22. The bar 40 reciprocates horizontally with every stroke of the crank. And its outer end 41 rides freely upon roller 42 at all times save only when block 34 engages block 35 which engagement lifts the end 41 of bar 40 and causes the block 43 on bar 40 at its next stroke to engage one of the pins 44 on wheel 7 and move the wheel or carrier two spaces or two cups bringing two empty cups under the discharge of the belts and removing the two filled ones. Thus the timing of filling the cups is determined by the rate of revolution of the shaft 29 carrying its block 34, this may be varied by causing the pawl 31 to engage more or less teeth of the ratchet at a stroke which is accomplished by moving the connection of the arm 33 into different holes in walking beam 24 giving more or less stroke to pawl arm 32. The shaft 29 carries a belt wheel 45 which drives belt 12 which is trained around suitable guide rollers 46, 47, and 48 bringing the belt 12 into engagement with the head block of cup spindles 6 thereby causing them and the cups mounted thereon to move at each intermittent movement of ratchet or timing shaft 29, which movement takes place while the packing pokers are above the cups 5, thereby not disturbing the shreds in the cups by the revolution of the cups. The pokers 11 slide loosely in their supports and go down by gravity thereby adjusting themselves to the mass of shreds as they accumulate. Weights 49 are provided to give proper thrust to the pokers. Above the cup spindles on the carrier wheel 7 there is a cutting disk 50 provided with apertures 51 over the cup spindles.

Mounted to slide on the top of cutting disk 50 there is fixed plate 52 to which the curved hoppers 28 are attached. The plate 52 and disk 50 act as a shear to cut off the shreds at each movement of the carrier with the cups. The cups 5 are perforated at the bottom to provide a connection to the suction chamber 9 through the cavities 10 and 63 of spindles 6. Whereby the suction can act on the shreds as they fall into the cups. Instead of suction I may use an air blast from above but I prefer to use the suction. Below the rolls 1 and 2 there are provided guide or deflecting plates 53 and 54 for directing the falling shreds upon the center of carrier belts 4. The belts 4 are made of two thicknesses, one on top of the other and the upper or outer one is the thinner and more flexible of the two and they are connected together by rivets 55 along a central line. Along the upper or carrying side of the belts there are provided guide boards 56, which extend inward between the parts of the belt causing the upper layer to assume the shape of a trough thereby holding the shreds in place on the belt and preventing thus displacement as they are carried along.

The rolls are provided with suitable adjustments to hold them in position to each other and also with suitable scrapers 57 to strip the shreds off them. The cups 5 are the subject of another patent and they are made in two pieces, the outer or shell piece sits over the top of the spindle 6 on to the shoulder 59, while the cone piece rests on the surface 60. Thus the cups are held upon the spindles, yet may easily be removed as there is clearance between the top of the cups and the under side of plate 50.

In place of the rolls for producing the shreds I may use any suitable shredding device or provide a suitable source of supply of the shreds in any manner.

What I claim is:—

1. The combination with devices for producing cereal shreds or filaments, of a series of laterally closed independent cups or forms, means for bringing said forms successively into position, and automatic means for filling each form with an independent mass of loose shreds from said devices while in such position.

2. The combination with a suitable form, of means for feeding long cereal shreds into said form, to fill the same gradually, and means for rotating the form upon its own axis during such feeding, whereby the long shreds are wound spirally in the form.

3. The combination with a series of suitable forms, of automatic means for bringing said forms successively, to rest in position for filling, means for rotating each form upon its own axis while so at rest, and means for delivering long cereal shreds in the form while it is so rotating; whereby each form of the series is filled with a nest-like body of spirally wound shreds.

4. The combination with a series of suitable forms, of automatic means for bringing the forms to rest successively in a predetermined position, means for rotating each form upon its own axis while it is in such position, means for continuously delivering cereal shreds in each form during such rotation, and means for cutting off the supply of shreds when the form is filled to the proper extent.

5. The combination with a suitable form, of means for progressively feeding cereal shreds into said form, and means for producing an air current through the form during such feeding, to gently urge the individual shreds toward proper position.

6. The combination with a suitable form, of means for progressively delivering in said form loose cereal shreds, and a packer arranged for gently pressing the shreds during such delivery.

7. The combination with a suitable form, of means for progressively delivering loose cereal shreds in said form, a packer arranged for gently pressing the shreds into place during such delivery and means for rotating the form while it is being filled.

8. Means for bringing cereal shreds from a source of supply, forms for receiving the shreds, packers for packing the shreds in the forms, and means for revolving the forms, and means for moving the forms in relation to the source of supply.

9. Means for bringing cereal shreds from a source of supply, forms for receiving the shreds, packers for packing the shreds in the forms, means for revolving the forms, means for moving the forms in relation to the source of supply, means for cutting off the shreds in the forms from the source of supply.

10. The method of forming biscuits of cereal shreds which consists of aggregating loose shreds and giving the mass a desired shape by gently pressing the shreds into a suitable form by means of a current of air.

11. The method of forming biscuits of cereal shreds which consists in progressively introducing the shreds into a suitable form and meantime creating an air current through the gradually increasing mass.

12. Means for supplying shreds, forms for receiving the shreds, an air current to place the shreds in the forms and packers to pack the shreds in the forms.

13. Means for supplying shreds, forms for receiving the shreds, an air current, and mechanical packers for placing the shreds in the forms, and means for revolving the forms.

14. Means for supplying shreds, forms for receiving the shreds, an air current and mechanical packers to place the shreds in the forms and means for moving the forms in relation to the source of supply.

15. Means for supplying shreds, forms for receiving the shreds, an air current and mechanical packers for placing the shreds into the forms and means for cutting off the source of supply from the shreds in the forms.

16. Means for supplying shreds, forms for receiving the shreds, an air current and mechanical packers for placing the shreds in the forms, means for moving the forms in relation to the source of supply, means for cutting off the shreds from the source of supply.

17. Means for supplying shreds, forms for receiving the shreds, an air current and mechanical packers for placing the shreds in the forms, means for revolving the forms in relation to the source of supply, means for cutting off the shreds in the forms from the source of supply.

18. Means for supplying shreds, forms for receiving the shreds, a guideway or hopper for directing the shreds into the forms, packers and an air current for placing the shreds in the forms.

19. Means for supplying shreds, forms for receiving the shreds, from the source of supply, a guideway or hopper for directing the shreds into the forms, means for packing the shreds in the forms and means for revolving the forms, and means for moving the forms in relation to the source of supply.

20. Means for supplying shreds, forms for receiving the shreds, a movable carrier for the forms, means for revolving the forms while on the carrier and means for packing the shreds in the forms on the carrier.

21. Means for supplying shreds, forms for receiving the shreds, a movable carrier for the forms, means for revolving the forms on the carrier, means for packing the shreds in the forms and means for cutting off the shreds from the source of supply.

22. A shredding device, a carrier for the shreds, forms for receiving the shreds from the carrier, said carrier moving faster than the shredding device, delivering the shreds drawn out in lines and when free from the shredder moving with impact thereby aiding in their packing in the forms.

23. A source of supply of the shreds, forms for receiving the shreds, the said forms mounted upon revolving spindles, said spindles mounted on a movable carrier, means for the revolving the spindles intermittently.

24. An apparatus of the class described, the combination with a suitable form having apertures in its walls, of means for delivering cereal shreds in the form, and means for simultaneously passing an air current through said apertures, substantially as set forth.

25. The combination with a suitable form having apertures in its walls, of means for delivering cereal shreds in said form, and means for withdrawing air from the space around the exterior of the form, substantially as set forth.

26. The combination with a rotary carrier, of a series of forms revolubly mounted in the carrier, means for rotating the carrier step by step, means for rotating certain of said forms while the carrier is at rest, means for progressively delivering cereal shreds to the rotating forms, and means for continuously urging the entering shreds toward the form walls, substantially as set forth.

Signed at Chicago June 12th 1905.

WILLIAM ERASTUS WILLIAMS.

Witnesses:
W. A. SHEAHAN,
W. F. DUNHAM.